United States Patent

[11] 3,566,133

| [72] | Inventors | Ervin L. Dorman, Jr.;<br>Walter R. Hogg, Hialeah, Fla. |
|------|-----------|---|
| [21] | Appl. No. | 713,958 |
| [22] | Filed | Mar. 18, 1968 |
| [45] | Patented | Feb. 23, 1971 |
| [73] | Assignee | Coulter Electronics Inc.<br>Hialeah, Fla. |

[54] A HEMOGLOBIN MEASURING METHOD AND APPARATUS HAVING VOLTAGE FOLLOWING WITH FEEDBACK
8 Claims, 3 Drawing Figs.

[52] U.S. Cl. .................................................. 250/214,
250/218, 307/235, 324/111, 356/40, 356/179, 356/205
[51] Int. Cl. .................................................. H01j 39/12
[50] Field of Search .................................... 307/235;
324/111; 250/218; 356/214, 40, 205, 179

[56] References Cited
UNITED STATES PATENTS

| 3,005,918 | 10/1961 | Judkins | 307/235 |
| 3,435,239 | 3/1969 | Stalberg | 250/219FX |
| 3,439,271 | 4/1969 | Metcalf et al. | 324/111X |
| 3,462,758 | 8/1969 | Reynal et al. | 324/111X |

Primary Examiner—James W. Lawrence
Assistant Examiner—C. M. Leedom
Attorney—Silverman & Cass ABSTRACT: Method for determining the hemoglobin content of a sample by the photoelectric monitoring of a reference and the sample and the transducing thereof into a pair of electrical signals representative of the relative light transmission of the two media. The reference signal is applied to a store and, through comparison with the sample signal, an output signal having a duration directly proportional to the hemoglobin content is elicited. Also, apparatus for carrying out such method in which a capacitive storage circuit is charged proportionally to the reference light transmission through use of a monochromatic light and photocell and is discharged to an intermediate value dependent upon the transmission of the sample, the duration of such discharging being the desired output. Interposed in series between the photocell and the storage circuit is an operational amplifier a diode and a switch. The amplifier provides a voltage follower enabling the diode to be a precise comparator between the two signal levels. The time dependent output is taken from the anode side of the diode.

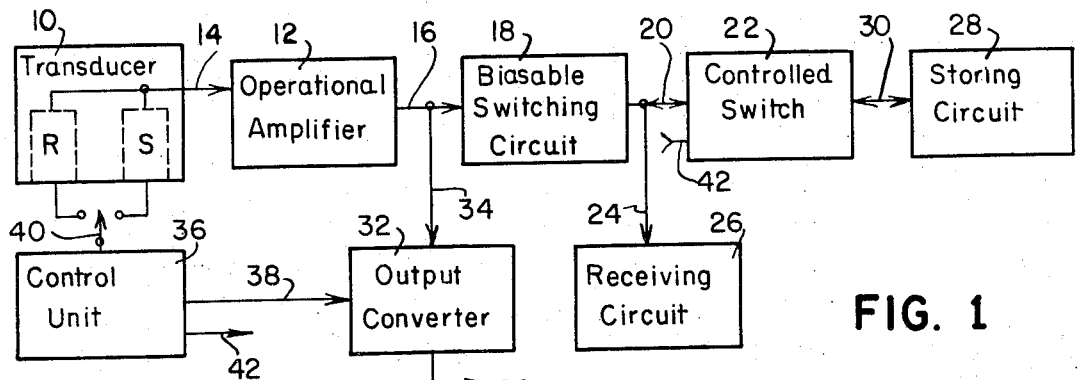
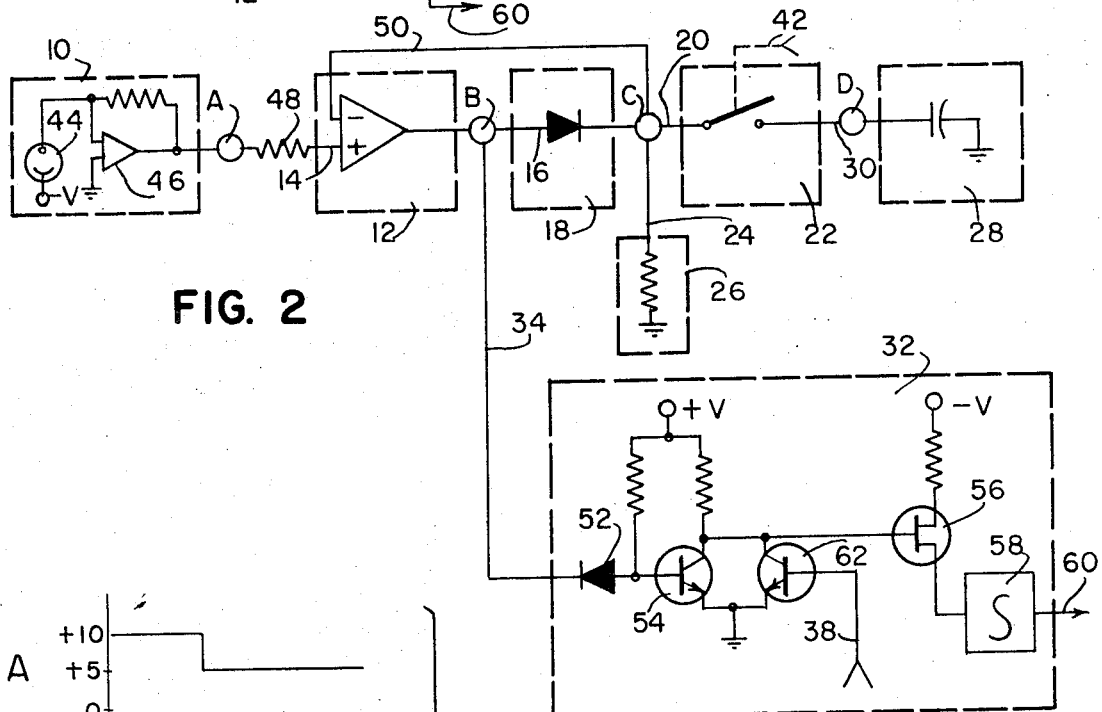
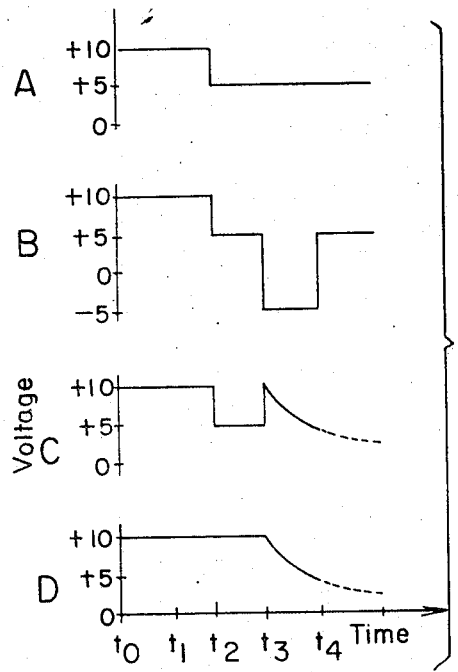
FIG. 1
FIG. 2
FIG. 3
Inventors
ERVIN L. DORMAN JR.
WALTER R. HOGG
By
*Silverman & Cass*
Attys.

A HEMOGLOBIN MEASURING METHOD AND APPARATUS HAVING VOLTAGE FOLLOWING WITH FEEDBACK

CROSS REFERENCE TO RELATED APPLICATIONS

In copending application Ser. No. 631,284 filed on Apr. 17, 1967, by the common assignee of this invention, there is described and claimed an apparatus in which a number of the parameters of blood are measured and derived from blood samples automatically. The heart of the equipment is the particle analyzing apparatus commonly known by its registered trademark "Coulter Counter." One of the important parameters which is obtained by the use of the "Coulter Counter" is the white blood cell count. In this automatic apparatus, a dilution of the blood sample is formed, treated and analyzed and, as a part of such analysis, the hemoglobin content is measured. The present invention is adapted to provide the method and apparatus for accomplishing such hemoglobin measurement.

FIELD OF THE INVENTION

This invention relates generally to a hemoglobin determining method and apparatus for carrying out that method and, more particularly, is concerned with method and apparatus for the determination of hemoglobin content by use of optic transmission as relatively measured through use of simple electrical charging circuit and an operational amplifier which apply bias to opposite sides of a diode. The duration of reverse bias of the diode is a measure of the hemoglobin content.

As well know known in the biological sciences, hemoglobin is an iron-containing protein pigment found in the red blood cells of man and many other forms of animal life. The relative amount of hemoglobin in a blood sample is one of the significant parameters employed in the diagnosis and treatment of various diseases and conditions, an example of the latter being anemia.

Known methods of ascertaining hemoglobin content consist of lysing the blood to break up the red cells and release the hemoglobin from the interior of the cells, and then chemically treating the resulting suspension with an appropriate reagent. Standards have been established by an international committee for hematology. The standard for the measure of hemoglobin, using a particular wavelength of light, is defined by the formula:

(1) $HGB = 36.77D = 36.77 \log_{10} 100/T$ in which $HGB$ is hemoglobin in grams per 100 ml., $D$ is the optical density or absorbance of a 540 nanometer light in 1.00 centimeter length, and $T$ is the light transmission in percent.

$D$ is indicated above as being equal to the logarithm to the base 10 of 100 divided by the percent transmission of the light. The selected wavelength can be achieved by the used use of certain filters and the length of beam can be adjusted by a factor in the results. The function is obviously logarithmic, and hemoglobinometers as a rule are a form of colorimeters with calibrated scales. Such apparatus is quite common.

DESCRIPTION OF THE PRIOR ART

Those closely related to the field of particle counting and analyzing are no doubt aware of the significant advances in the art provided by the numerous commercial devices marketed under the trademark "Coulter Counter" and protected by numerous patents such as U.S. Pat. Nos. 2,656,508; 2,869,078; and 3,259,842. These patents provide a general background to the present invention. In the cited copending application Ser. No. 631,284 there is provided a specific interrelationship between the prior "Coulter Counters" and the present invention.

SUMMARY OF THE INVENTION

The present invention is externally programmed to first receive and store in an electrical circuit a signal value representative of a reference, such as that of the diluent for the blood sample. Next, the diluted blood sample is introduced, electrooptically transduced into an electric signal having a representative transmission value, and applied to a biasable switching circuit coupled to the same electric storage circuit. Because of the density difference between the reference and the sample, the storage circuit is forced to alter the value of the stored signal. The duration of this alteration is proportional to the hemoglobin in the sample and the alteration causes a reverse biasing of the switching circuit. Appropriate output circuitry converts the duration of the alteration in storage to a direct reading of hemoglobin content. In the preferred embodiment, an operation amplifier, coupled in a voltage follower mode, is interposed between the signal source and the biasable switching circuit.

Accordingly it is a primary object of this invention to provide a method and apparatus for automatically determining the hemoglobin content of a sample.

Another object of this invention is to provide a highly simplified method and apparatus for the colorimetric measuring of hemoglobin content.

A further object of this invention is to provide an improved, sequentially operating, colorimeter, specially adapted for use as a hemoglobinometer.

Yet another object of this invention is to provide a highly accurate hemoglobinometer operating in a voltage following and voltage comparing mode.

Other objects and advantages of this invention will become apparent to those skilled in the art from the accompanying detailed description taken in conjunction with the following drawings portions of which are in block form, since the electronically skilled will recognize equivalent alternates which could be employed in carrying out the teachings of this invention.

BRIEF DESCRIPTION OF THE DRAWINGS

FIG. 1 is a block diagram of apparatus according to this invention;

FIG. 2 is a simplified electrical schematic of the invention; and

FIG. 3 is a chart depicting the voltage at different locations of the apparatus at progressive times.

DESCRIPTION OF THE PREFERRED EMBODIMENT

Referring first to FIG. 1, there is shown in block form an electrooptical transducer 10. This transducer can take various forms and handle different types of inputs to accomplish its goal —that of providing a pair of sequential electrical outputs, one representative of the light transmission of a reference, the other representative of the light transmission of the diluted blood sample. In a simple form, there could be a photocell and a source of illumination fixed on opposite sides of a small passageway into which would sequentially pass a reference cell $R$ and then a sample cell $S$ containing the diluted blood sample. The reference cell could contain a volume of diluent which would include the standard saline, preservative, hemoglobin reagent, and lysing material. So composed, the diluent would have a certain optical density which would cause a relative amount of absorption of the illumination passing through to the photocell. By use of a volume of the diluent as a reference and by using a common source of diluent for both the reference cell $R$ and the sample cell $S$, variations of the optical density of the diluent due to its composition, temperature, etc. would not create inbred deviations in the comparative color monitoring.

A simple form of the transducer 10 would substitute either a diluent simulating reference filter, air, clear water or other reference fluid or substance, in lieu of the fluid volume of the diluent. A more sophisticated form of the transducer would operate on the principle of a flow-through cell and provide automated processing of consecutive blood samples.

Continuing with reference to FIG. 1, an operational amplifier 12 is coupled to the output of the transducer 10 via a line 14. The operational amplifier is internally arranged in a voltage follower mode such that its output voltage on a line 16 closely follows its input on the line 14. The operational amplifier will be discussed in greater detail with reference to FIG. 2, as will all of the circuit blocks shown in FIG. 1.

A biasable switching circuit 18 has its input side coupled to the output of the operational amplifier via the line 16. Accordingly, the inputs to both the amplifier 12 and the circuit 18 are in voltage following relationship. The output side of the switching circuit is coupled by a line 20 to a first side of a controlled switch 22 and by a line 24 to a receiving circuit 26. A storage circuit 28 is coupled to a second side of the controlled switch 22 by a line 30. The arrowheads associated with the lines 20 and 30 represent the fact that the storage circuit 28 is adapted to be charged through the switch 22 and subsequently discharged through the same switch to the receiving circuit 26.

An output converter 32 is coupled by a line 34 to the output of the operational amplifier. A control unit 36 provides, by a line 38, a control input to the output converter. A switching lead 40 selectively regulates which of the cells $R$ or $S$ is being operated upon by the transducer 10. The control unit also regulates the status of the controlled switch, as symbolized by a control line 42.

Very briefly, the apparatus of FIG. 1 operates sequentially as follows. Initially the control unit 36 selects the reference $R$ to be transduced and closes the switch 22, such that a voltage proportional to the light transmission of the reference is fed through the follower 12, the circuit 18, and the switch 22 to the storing circuit 28. The control unit then opens the switch 22 and selects and sample $S$ for transducing. The sample has a lower quantum of light transmission than the reference $R$; hence, the voltage fed through the amplifier 12 and the biasable switching circuit 18 is less than that stored in the storing circuit 28. Next, the control unit closes the switch 22 and enables a discharge from the storing circuit through the controlled switch to the receiving circuit 26. The discharging continues to be significant until the storing circuit is at the same lower potential as that being transduced with respect to the sample $S$.

During the discharge period, the biasable switching circuit circuit 18 is reverse biased. Because of the discharging condition and via the line 34, the amplifier 12 triggers the output converter 32. As soon as the charge on both sides of the switching circuit is again balanced, the triggering input is removed to the converter. The converter 32 measures the duration that it was enabled and this measurement is proportional to the difference in light transmission between the reference and the sample, which is of course a directly proportional measurement of the hemoglobin content of the sample.

The details of the subject hemoglobinometer will become clearer with joint reference to the schematic in FIG. 2 and the voltage chart in FIG. 3. It should be recognized that the circuitry combinations shown in FIG. 2 are of a preferred embodiment and are not to be considered as limiting the circuit blocks they represent. For simplicity of illustration, the control unit 36 is not shown in FIG. 2; however, its output lines 38 and 42 are shown connected to the elements 32 and 22, respectively.

The primary electrical components within the transducer 10 are a photocell 44 and a current to voltage converter 46. The output line 14 contains an isolating and stabilizing resistor 48 and a node $A$. The node $A$ and other nodes, next to be identified, are for voltage comparison of different points in the schematic and correlate to similarly identified wave forms in FIG. 3. For purposes of example, it is to be assumed that a positive 10-volt signal is generated by the transducing of the reference $R$, and the transducing of the sample $S$ elicits a positive signal of only 5 volts. Thus, at $t_1$ in FIG. 3 at the node $A$ waveform, +10 voltage is shown and represents that the light transmission of the reference is then being measured by the photocell 44.

The node $A$ is coupled into the positive (+) input of the operational amplifier 12. This amplifier is illustrated symbolically rather than in circuit detail, since numerous forms of circuitry could be employed, as long as they are operated in a voltage follower mode, such that the voltage at a node $B$ in the amplifier output line 16 followed very accurately the voltage at the node $A$. Voltage following operational amplifiers meet this criterion by providing nearly infinite input impedance (in the order of 100 megohms) for minimum of loading, especially low output impedance (in the order of 1 ohm), and high gain. The illustrated amplifier 12 is of the balance differential type and has a negative input (−) coupled in degenerative feedback relation from a node $C$. Even a few millivolts variation between the two inputs will cause the output to swing with stability from full negative to full positive saturation. In this form, the amplifier has negligible attenuation and is well suited for its task of attempting to maintain the voltage at the nodes $A$, $B$ and $C$ all at the same level. Such is shown at $t_0$ on the waveforms $A$, $B$, and $C$.

Although other and simpler forms of voltage follower circuitry might be employed, the precision required and obtained in this invention would suffer. It is even possible to directly connect or merge nodes $A$ and $B$; however, stability and accuracy would be less than desirable.

The biasable switching circuit 18 comprises a diode coupled to be forward biased by the voltage at the node $B$ and reverse biased by the voltage at the node $C$. The feedback from the node $C$ to the negative input of the amplifier 12 is by way of a line 50. The line 24 couples both the node $C$ and the line 20 to the receiving circuit 26, which comprises a resistor coupled to ground.

A junction point or node $D$ and the node $C$ are on opposite sides of the controlled switch 22 and are connected thereto by the lines 30 and 20, respectively. The node $D$ is indicative of the voltage across the storage circuit 28, which comprises a capacitor coupled to ground. Obviously, the storing and receiving circuits form a conventional RC circuit.

Although the switch 22 is illustrated normally open, at time $t_0$ it is closed by the control unit 36 so that the +10 voltage at nodes $A$, $B$ and $C$ is also applied to the charging circuit; hence, node $D$ is also at +10 voltage. For purposes of this description, the typical voltage drop across the biasable diode 18 has been ignored for simplicity of discussion; however, it is recognized that at $t_0$, the voltage at the node $B$ will be greater than +10, such as +10.6 volts.

For the moment, the contents of the output converter 32 will not be described, except to note that at its input there is a diode 52 coupled normally to be reverse biased by the positive voltage at the node $B$, which is of greater magnitude than that applied to the diode by the $+V$ source symbolized in the output converter. Accordingly, at time $t_0$, during the transducing of the reference $R$, the output converter is disabled. As will be detailed subsequently, the output converter 32 is enabled only when the node $B$ is at a negative potential, i.e., between times $t_3$ and $t_4$.

At time $t_1$, the control unit 36 applies a signal on the line 42 to cause the switch 22 to open and isolate the so storing circuit 28 from the rest of the circuitry. As shown in FIG. 3, the voltages at each of then the nodes remain constant. At time $t_2$, the control unit transfers its switching lead 40 to the sample $S$ position and also applies an inhibit signal to the output converter via the line 38 to prevent any switching transients from inadvertently triggering the output converter.

Since the sample $S$ transmits a lesser quantum of light, a lower voltage, such as +5 volts, is seen at the node $A$, is followed at the node $B$, and forward biases the diode of the switching circuit 18 to place the node $C$ also at +5 volts.

It is to be remembered that the switch 22 was opened at time $t_1$ and remains open at time $t_2$. At time $t_3$, the control unit again closes the switch 22 and thereby elicits significant reactions. The nodes $C$ and $D$, having different voltages, are coupled together. The node $C$ would continue to be fed the +5 volts from the transducer 10, the follower and the switching circuits 12 and 18 except for a reverse biasing of the circuit 18 as next noted. The node $D$ can only draw from the stored voltage in the storing circuit 28. Thus, at time $t_3$, the storing circuit discharges through the nodes $D$ and $C$ into the resistor of receiving circuit 26 to ground. This causes the voltage at the node $C$ to jump to +10 volts and then decay toward ground simultaneously with the voltage at the node $D$.

As soon as the node $C$ jumps to +10 volts, the biasable switching circuit 18 becomes reverse biased, preventing direct communication from the node $B$ to the node $C$. At the same time, the feedback line 50 carries a significantly different voltage than that being applied to the line 14 to the amplifier 12. Hence, the operational amplifier is driven into saturation and its output voltage at node $B$ drops to −5 volts. As a result, the diode 52 in the output converter 32 becomes forward biased and enables operation of the converter.

During the time between $t_3$ and $t_4$, the respective voltages are as shown in FIG. 3. At time $t_4$, the voltage at the node $C$ has decayed to +5 volts, that value is also being applied to the negative input of the amplifier 12 via the feedback line 50, and the same voltage quantity is being applied, via the input line 14, to the positive input of the operational amplifier. As a result, the inputs to the operational amplifier are balanced, it comes out of saturation, its output voltage at the node $B$ snaps back to +5 volts, and the diode 52 in the output converter is again reverse biased, disabling further operation of that converter. Thus, the precise time of voltage discharge from the reference level to the sample level has been measured and is capable of conversion into an equivalent hemoglobin calculation for the sample.

Looking now at the circuitry of the output converter and simultaneously discussing its operation, when the diode 52 is forward biased, current draws away from the base of a transistor 54, switches it off and causes its collector voltage to go positive. The positive collector voltage is applied to the base of a unijunction transistor 56, turns it on and provides an output to an integrator 58. The integrator is operative for the duration of $(t_4−t_3)$ and provides at its output 60 an analogue value of hemoglobin content for further processing by appropriate equipment, not shown. A transistor 62 has its base connected to the inhibit signal line 38 to prevent the inadvertent switching on of the unijunction during the time $t_2$.

As soon after time $t_4$ as mechanically practical, the reference $R$ can again be selected by the control unit to commence another cycle of operations from times $t_0$ through $t_4$. The same or different samples can be analyzed each cycle or on periodic or alternate basis, depending upon the programming of the control unit and the needs of the user.

Thus it will be seen that the disclosed hemoglobinometer is an especially precise, relatively simple, cyclically operable device which meets the initially presented objects both as to method and apparatus. Inasmuch as the method of this invention could be accomplished by structure other than that described, or its equivalent, the method is not to be limited by the structure.

It is believed that the inventive method and apparatus has been described with sufficient detail to enable those skilled in the art to understand and practice their teachings. It is anticipated that electrical circuit as well as structural variations may occur to those skilled in the art without there arising a departure from the spirit and scope of the invention.

We claim:

1. A method for determining the hemoglobin content of a sample comprising the steps of:

transducing into a pair of discrete electrical signals the light transmission of said sample and a reference;

applying to a store the larger of said pair of signals;

applying to comparing means the other of said pair of signals;

comparing said signals while emptying the store until said signals are equal;

following, in an electrical mode, at a location leading to the comparing means, the other of said transduced signals during its said applying step;

feeding back to said location, during said emptying, the signal then in the store; and measuring the time duration of said emptying.

2. The method defined in claim 1 further comprising the step of inhibiting the store from emptying prior to said comparing.

3. The method defined in claim 1 in which:

said following is in a voltage mode and in which;

said measuring is enabled by a conflict resulting from an attempted following of a signal which differs significantly from that being fed back.

4. A hemoglobinometer comprising:

a transducer adapted to generate a pair of discrete signals representative of the light transmissions of a reference and a sample;

storing means coupled to said transducer to receive and store one of said signals;

receiving means coupled on demand to said storing means and, when so coupled, adapted to receive a portion of said one stored signal;

control means for enabling said receiving means subsequent to the storing of said one signal and during the generation of the other of said signals;

a biasable circuit interposed between said transducer and said storing means and adapted to be characteristically responsive for the duration that said receiving means is receiving the portion of the one signal, such duration being proportional to the transmission of the sample;

a voltage follower interposed between said transducer and the input of said biasable circuit;

a feedback path for said voltage follower; and said feedback path being coupled between the output of said biasable circuit and an input of said voltage follower.

5. A hemoglobinometer as defined in claim 4 in which said control means includes a switch interposed between said receiving means and said storing means, and said hemoglobinometer further comprises:

an output converter coupled to a node which is interposed between said transducer and said biasable circuit, and said output converter adapted to be responsive to the characteristic response of said biasable circuit.

6. A hemoglobinometer as defined in claim 5 in which:

said biasable circuit comprises a first diode and said characteristic response depends upon the bias state of said first diode;

a second diode defines an input stage of said output converter; and said diodes being oppositely poled with respect to said node.

7. A hemoglobinometer as defined in claim 6 in which:

said storing and receiving means in combination define an RC circuit; and said output converter includes analogue means enabled by said second diode for the duration of its response.

8. A hemoglobinometer as defined in claim 4 in which:

said voltage follower is an operational amplifier of the balanced differential type; and said feedback path and said transducer being coupled to two separate inputs of said amplifier.